United States Patent
Yen

(10) Patent No.: US 8,972,527 B2
(45) Date of Patent: *Mar. 3, 2015

(54) METHOD AND SYSTEM FOR REDUCTION OF DELAY AND BANDWIDTH REQUIREMENTS IN INTERNET DATA TRANSFER

(71) Applicant: Robert C. Yen, Milpitas, CA (US)

(72) Inventor: Robert C. Yen, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/961,076

(22) Filed: Aug. 7, 2013

(65) Prior Publication Data

US 2013/0326068 A1 Dec. 5, 2013

Related U.S. Application Data

(63) Continuation of application No. 09/578,816, filed on May 24, 2000, now Pat. No. 8,516,146.

(60) Provisional application No. 60/167,516, filed on Nov. 24, 1999, provisional application No. 60/188,982, filed on Mar. 13, 2000.

(51) Int. Cl.
*H04L 12/911* (2013.01)
*H04L 29/08* (2006.01)
*H04L 29/06* (2006.01)

(52) U.S. Cl.
CPC ............ *H04L 47/70* (2013.01); *H04L 67/1078* (2013.01); *H04L 69/18* (2013.01); *H04L 67/16* (2013.01); *H04L 67/06* (2013.01); *H04L 67/2819* (2013.01); *H04L 67/02* (2013.01); *H04L 67/1002* (2013.01); *H04L 67/2833* (2013.01); *H04L 69/329* (2013.01)

USPC .................... 709/217; 709/230; 709/238

(58) Field of Classification Search
CPC ..... H04L 47/00; H04L 47/10; H04L 43/0852; H04L 12/185; H04L 12/18; H04L 69/18; H04L 67/1078
USPC ................. 709/217, 235, 245, 230, 238
See application file for complete search history.

(56) References Cited

U.S. PATENT DOCUMENTS

| | | | |
|---|---|---|---|
| 5,208,804 | A | 5/1993 | Wilson et al. |
| 5,521,591 | A | 5/1996 | Arora et al. |
| 5,564,120 | A | 10/1996 | Orimo et al. |
| 5,701,451 | A | 12/1997 | Rogers et al. |

(Continued)

FOREIGN PATENT DOCUMENTS

| | | |
|---|---|---|
| WO | WO 01/11488 A2 | 2/2001 |
| WO | WO 01/11502 A2 | 2/2001 |
| WO | WO 01/11503 A2 | 2/2001 |

OTHER PUBLICATIONS

U.S. Appl. No. 09/578,816, filed May 24, 2000.

(Continued)

*Primary Examiner* — Kristie Shingles

(57) ABSTRACT

Techniques for efficiently and economically providing data transfer through data networks are disclosed. The techniques are particularly suitable for Internet data transfers. In one aspect, delayed response processing is utilized. Requests for common content are initially queued. After a short period of time, the queued requests are processed as a group so as to better utilize available bandwidth, particularly in times where traffic or congestion is high. In another aspect, multiple-destination data packets are utilized.

5 Claims, 12 Drawing Sheets

FILE_1 SUB-QUEUE — 600

| REQUEST | DESTINATION | TIMESTAMP |
|---|---|---|
| REQUEST #1000 | REGION D | 12:00:00 |
| REQUEST #1001 | REGION G | 12:00:01 |
| REQUEST #1002 | REGION D | 12:00:10 |
| REQUEST #1003 | REGION G | 12:00:12 |
| ○ ○ ○ | | |
| REQUEST #1020 | REGION D | 12:00:15 |
| REQUEST #1021 | REGION D | 12:00:20 |
| REQUEST #1022 | REGION D | 12:00:25 |
| ○ ○ ○ | | |
| REQUEST #2000 | REGION G | 12:01:00 |

(56) References Cited

U.S. PATENT DOCUMENTS

| | | |
|---|---|---|
| 5,701,580 A | 12/1997 | Yamane et al. |
| 5,764,235 A | 6/1998 | Hunt et al. |
| 5,808,607 A | 9/1998 | Brady et al. |
| 5,809,242 A | 9/1998 | Shaw et al. |
| 5,859,840 A | 1/1999 | Tiedemann, Jr. et al. |
| 5,870,562 A | 2/1999 | Butman et al. |
| 5,878,416 A | 3/1999 | Harris et al. |
| 5,896,502 A | 4/1999 | Shieh et al. |
| 5,933,600 A | 8/1999 | Shieh et al. |
| 5,944,780 A | 8/1999 | Chase et al. |
| 5,956,716 A * | 9/1999 | Kenner et al. ........................ 1/1 |
| 5,961,602 A | 10/1999 | Thompson et al. |
| 5,983,030 A | 11/1999 | Nagano |
| 5,987,480 A | 11/1999 | Donohue et al. |
| 5,991,809 A | 11/1999 | Kriegsman |
| 5,996,007 A | 11/1999 | Klug et al. |
| 6,003,030 A | 12/1999 | Kenner et al. |
| 6,006,264 A | 12/1999 | Colby et al. |
| 6,014,698 A | 1/2000 | Griffiths |
| 6,014,707 A | 1/2000 | Miller et al. |
| 6,088,578 A | 7/2000 | Manning et al. |
| 6,097,733 A | 8/2000 | Basu et al. |
| 6,108,703 A | 8/2000 | Leighton et al. |
| 6,112,239 A | 8/2000 | Kenner et al. |
| 6,115,378 A | 9/2000 | Hendel et al. |
| 6,185,598 B1 | 2/2001 | Farber et al. |
| 6,259,915 B1 | 7/2001 | Raith |
| 6,298,234 B1 | 10/2001 | Brunner |
| 6,310,941 B1 | 10/2001 | Crutcher et al. |
| 6,330,244 B1 | 12/2001 | Swartz et al. |
| 6,330,671 B1 | 12/2001 | Azoz |
| 6,363,410 B1 | 3/2002 | Kanamori et al. |
| 6,370,688 B1 | 4/2002 | Hejna, Jr. |
| 6,418,148 B1 | 7/2002 | Kumar et al. |
| 6,466,933 B1 | 10/2002 | Huang et al. |
| 6,477,565 B1 | 11/2002 | Daswani et al. |
| 6,483,820 B1 | 11/2002 | Davidson et al. |
| 6,519,252 B2 | 2/2003 | Sallberg |
| 6,526,580 B2 | 2/2003 | Shimomura et al. |
| 6,535,742 B1 | 3/2003 | Jiang et al. |
| 6,608,832 B2 | 8/2003 | Forslow |
| 6,658,269 B1 | 12/2003 | Golemon et al. |
| 6,665,704 B1 | 12/2003 | Singh |
| 6,721,294 B1 | 4/2004 | Bahrenburg et al. |
| 6,742,016 B1 | 5/2004 | Bhoj |
| 6,795,411 B1 | 9/2004 | Dino et al. |
| 6,856,804 B1 | 2/2005 | Ciotta |
| 6,968,394 B1 * | 11/2005 | El-Rafie ........................ 709/245 |
| 7,003,558 B2 | 2/2006 | Agrusa et al. |
| 7,239,632 B2 | 7/2007 | Kalavade et al. |
| 7,245,634 B2 | 7/2007 | Yen |
| 7,523,173 B2 | 4/2009 | Seki et al. |
| 8,307,113 B2 | 11/2012 | Yen |
| 8,516,146 B1 * | 8/2013 | Yen ............................... 709/235 |
| 2001/0001268 A1 | 5/2001 | Menon et al. |
| 2001/0006517 A1 | 7/2001 | Li et al. |
| 2001/0022784 A1 | 9/2001 | Menon et al. |
| 2001/0032236 A1 | 10/2001 | Lin |
| 2001/0043588 A1 | 11/2001 | Sallberg |
| 2001/0048686 A1 | 12/2001 | Takeda et al. |
| 2001/0052003 A1 | 12/2001 | Seki et al. |
| 2001/0055286 A1 | 12/2001 | Lin et al. |
| 2002/0001337 A1 | 1/2002 | Chauncey et al. |
| 2002/0010753 A1 | 1/2002 | Matsuoka et al. |
| 2002/0037004 A1 | 3/2002 | Bossemeyer et al. |
| 2002/0045459 A1 | 4/2002 | Morikawa |
| 2002/0048268 A1 | 4/2002 | Memon et al. |
| 2002/0073155 A1 | 6/2002 | Anupam et al. |
| 2002/0078235 A1 | 6/2002 | Yen |
| 2002/0191575 A1 | 12/2002 | Kalavade et al. |
| 2004/0018854 A1 | 1/2004 | Gorsuch |
| 2004/0097260 A1 | 5/2004 | Stenton et al. |
| 2005/0135299 A1 | 6/2005 | Bishop et al. |
| 2005/0220048 A1 | 10/2005 | Lee et al. |
| 2006/0128302 A1 | 6/2006 | van Rooyen et al. |

OTHER PUBLICATIONS

Office Action for U.S. Appl. No. 09/578,816 dated May 22, 2003.
Final Office Action for U.S. Appl. No. 09/578,816 dated Dec. 18, 2003.
Office Action for U.S. Appl. No. 09/578,816 dated Jun. 7, 2007.
Restriction Requirement for U.S. Appl. No. 09/578,816 dated Mar. 5, 2007.
Final Office Action for U.S. Appl. No. 09/578,816 dated Dec. 12, 2007.
Advisory Action for U.S. Appl. No. 09/578,816 dated Mar. 5, 2008.
Final Office Action for U.S. Appl. No. 09/578,816 dated Aug. 26, 2008.
Notice of Appeal for U.S. Appl. No. 09/578,816, filed Jan. 14, 2010.
Advisory Action for U.S. Appl. No. 09/578,816 dated Mar. 2, 2010.
Examiner's Answer to Appeal Brief for U.S. Appl. No. 09/578,816 dated Dec. 15, 2010.
Decision on Appeal for U.S. Appl. No. 09/578,816 dated Dec. 15, 2010.
Advisory Action for U.S. Appl. No. 09/578,816 dated Jun. 24, 2004.
Final Office Action for U.S. Appl. No. 09/578,816 dated Oct. 14, 2009.
Notice of Allowance for U.S. Appl. No. 09/578,816 dated Mar. 28, 2013.
Appeal Docketing Notice for U.S. Appl. No. 09/578,816, filed May 12, 2011.
U.S. Appl. No. 09/967,532, filed Sep. 27, 2001.
Restriction Requirement for U.S. Appl. No. 09/967,532 dated Jan. 13, 2005.
Office Action for U.S. Appl. No. 09/967,532 dated May 3, 2005.
Office Action for U.S. Appl. No. 09/967,532 dated Nov. 14, 2005.
Final Office Action for U.S. Appl. No. 09/967,532 dated May 17, 2006.
Advisory Action for U.S. Appl. No. 09/967,532 dated Jul. 14, 2006.
Advisory Action for U.S. Appl. No. 09/967,532 dated Aug. 25, 2006.
Office Action for U.S. Appl. No. 09/967,532 dated Nov. 16, 2006.
Notice of Allowance for U.S. Appl. No. 09/967,532 dated Mar. 23, 2007.
Issue Notification for U.S. Appl. No. 09/967,532 dated Jun. 27, 2007.
Akamai Technologies, Inc., webpages on Akamai Streaming Overview and Freeflow, http://www.akamai.com, downloaded Feb. 20, 2000.
Cnet features-techno-20 questions: How the Net works, "How does the Net work?" http://coverage.cnet.com/Content/Features/Techno/Networks/ss02.html, downloaded Feb. 19, 2000.
Cnet features-techno-20 questions: How the New works, "What is the Internet?" http://coverage.cnet.com/Content/Features/Techno/Networks/sso1.html, downloaded Feb. 19, 2000.
"iShopper.com Inc. Acquires Uniq Studios Inc", Company Press Release, May 16, 2000, http://biz.yahoo.com/bw/000516/ut_ishoppe.html, downloaded Jul. 9, 2000.
U.S. Appl. No. 11/775,092, filed Jul. 9, 2007.
Office Action for U.S. Appl. No. 11/775,092 dated Mar. 2, 2010.
Final Office Action for U.S. Appl. No. 11/775,092 dated Aug. 20, 2010.
Advisory Action for U.S. Appl. No. 11/775,092 dated Jan. 31, 2011.
Notice of Appeal for U.S. Appl. No. 11/775,092 dated Feb. 22, 2001.
Office Action for U.S. Appl. No. 11/775,092 dated Oct. 7, 2011.
Notice of Allowance for U.S. Appl. No. 11/775,092 dated May 16, 2012.
Notice of Allowance for U.S. Appl. No. 11/775,092 dated Jul. 20, 2012.
Issue Notification for U.S. Appl. No. 11/775,092 dated Oct. 17, 2012.
International Search Report and Written Opinion for International Patent Application No. PCT/US01/30469, mailed Oct. 10, 2002.
Office Action for U.S. Appl. No. 13/632,818, mailed Feb. 28, 2014.
Office Action for U.S. Appl. No. 13/961,076, mailed Jun. 24, 2014.

* cited by examiner

METHOD AND SYSTEM FOR REDUCTION OF DELAY AND BANDWIDTH REQUIREMENTS IN INTERNET DATA TRANSFER

CROSS-REFERENCE TO RELATED APPLICATIONS

This application is a continuation application of U.S. patent application Ser. No. 09/578,816, filed May 24, 2000, entitled "METHOD AND SYSTEM FOR REDUCTION OF DELAY AND BANDWIDTH REQUIREMENTS IN INTERNET DATA TRANSFER," which is herein incorporated by reference, which in turn claims priority benefit of: (i) U.S. Provisional Patent Application No. 60/167,516, filed Nov. 24, 1999, and entitled "REDUCTION OF DELAY AND BANDWIDTH REQUIREMENTS IN INTERNET DATA TRANSFER", and which is hereby incorporated by reference herein; and (ii) U.S. Provisional Patent Application No. 60/188,982, filed Mar. 13, 2000, and entitled "REDUCTION OF DELAY AND BANDWIDTH REQUIREMENTS IN INTERNET DATA TRANSFER", and which is hereby incorporated by reference herein.

BACKGROUND OF THE INVENTION

1. Field of the Invention

The present invention relates to networks and, more particularly, to data transmission over networks.

2. Description of the Related Art

The Internet or the World Wide Web is a global network of interconnected computers. Clients or users can access files or documents, e.g., hypermedia documents, residing on the host website computers connected to the Internet through use of a network browser interface program. Examples of network browser interface program include Netscape Navigator or Microsoft Explorer. One type of hypermedia documents is commonly referred to as web pages. Sites or documents on the Internet are typically chosen by a user by entering a site address, i.e., a Universal Resource Locator (URL), or by a selection of a link on a displayed web page.

FIG. 1 is a conventional client/server system 100. The conventional client/server system 100 includes a client system 102 that couples to a server system 104 via the Internet 106. In this manner, any of a plurality of local files 108 (documents) associated with the server system 104 can be delivered to the client system 102 through the Internet 106. For example, the server system 104 transfers data for files 108 to the client system 102 through the Internet 106 utilizing a standard protocol, e.g., Hyper Text Transfer Protocol (HTTP), for transferring data through the Internet 106. The server system 104 represents a host website computer providing the local files 108.

Unfortunately, due to the increased popularity of the use of the Internet 106 and due to increases in file sizes that are to be delivered to the client system 102 through the Internet 106, increasing demands are placed on the server system 104 to handle the increased traffic. The file sizes continue to increase as files (e.g., web pages) become more elaborate and more graphical. As a result, congestion tends to develop at a link 110 that couples the server system 104 to the Internet 106. The link 110 is typically a leased line or other high speed connection (e.g., a T1 or T4 line), also referred to as a high speed, high bandwidth telecommunication link. However, when numerous client systems seek to access the same server system 104, the link 110 faces congestion because the bandwidth supported by the link 110 is limited. Such congestion or increased traffic also places a substantial burden on the server system 104 to satisfy all of the requests for the local files 108. Besides the problematic congestion that develops at the link 110, the increased popularity of the Internet 106 and the increases in file sizes transmitted through the Internet 106, there is also general congestion in the Internet 106. This general congestion (or traffic) leads to slowed data transfer through the Internet 106, and thus clients or users face long waiting times.

Conventional solutions to these traffic or congestion problems have caused website owners to increase the number of server systems 104 they operate and have caused website owners to lease additional bandwidth for the links 110. Typically, if the website owner has multiple server systems 104, they are operated in a clustered or mirrored fashion. The ability to use mirrored web sites allows different server systems carrying the same content to be placed in different geographic locations and/or telecommunication regions of the United States or the world. This helps disperse, or at least localize, the traffic or congestion. Also, by leasing additional bandwidth, additional amounts of traffic can be supported. While both of these approaches do allow additional traffic to be supported, they are expensive solutions and require website owners to purchase hardware and lease bandwidth suitable for worst case scenarios. Website owners find purchasing hardware and leasing of bandwidth for worst case scenarios too expensive. Worst case scenarios are also difficult to predict given the rapid growth of Internet usage. As a result, traffic and congestion problems continue to result during periods of high demand.

Therefore, there is a need for improved techniques for efficiently and economically providing data transfer through data networks during high traffic conditions.

SUMMARY

Broadly speaking, the invention relates to techniques for efficiently and economically providing data transfer through data networks. The invention is particularly suitable for Internet data transfers.

In one aspect of the invention, delayed response processing is utilized. Requests for common content are initially queued. After a short period of time, the queued requests are processed as a group so as to better utilize available bandwidth, particularly in times where traffic or congestion is high. In another aspect of the invention, multiple-destination data packets are utilized.

The invention can be implemented in numerous ways, including as a method, system, apparatus, and computer readable medium. Several embodiments of the invention are discussed below.

As a method for satisfying a request for content from a web server, one embodiment can, for example, include at least the acts of: determining whether a response to the request can be delayed; processing the request to obtain the response in an intentionally delayed manner when the determining determines that the response to the request can be delayed; and processing the request without any intentional delay when the determining determines that the response to the request cannot be delayed.

As a method for sending data over the Internet, one embodiment can, for example, include at least the acts of: receiving a plurality of requests for a particular resource provided at a remote server on the Internet, the plurality of requests being provided by different requestors; retrieving the particular resource from the remote server once for the plurality of requests to obtain the particular resource requested by the plurality of requests; and thereafter sending the particular resource to the different requestors.

As a method for servicing a request for a resource over a data network, one embodiment can, for example, include at least the acts of: receiving requests for resources; temporarily storing the requests for resource in a queue; identifying a request in the queue for a particular resource that has been waiting for more than a predetermined period of time; requesting data for the identified request for the particular resource from a remote content server; forming multi-destination data packets for responses to the identified request and other requests in the queue for the particular resource; and transmitting the multi-destination data packets.

As a data transmission system for transmitting data from content servers to requestors through a data network, one embodiment can, for example, include at least a plurality of data distribution centers. The data distribution centers are connected to the data network. Data transmissions between the content servers and the data distribution centers use a multi-destination format so as to reduce congestion.

As a system for transmitting data through a data network from servers to clients, one embodiment can, for example, include the at least a plurality of data distribution centers coupled to the data network, and server modules provided in the servers. The server modules operate to receive data to be transmitted to the clients and to form multi-destination packets to carry the data to at least one of the data distribution centers. The data distribution centers receive the multi-destination packets from the server modules and operates to convert the multi-destination packets into single-destination packets.

As a method for transferring data through a data network from a server to clients, one embodiment can, for example, pertains to an improvement wherein the data is transferred between the server and a data distribution center using a multi-destination format, thereby reducing congestion at the server.

As a method for delivering a response from a server to requests from clients for use in a data network, one embodiment can, for example, pertain to an improvement wherein the response is processed in a group of responses for the same resource so as to reduce congestion at the server.

As a system for sending data over the Internet, one embodiment can, for example, include at least: means for receiving a plurality of requests for a particular resource provided at a remote server on the Internet, the plurality of requests being provided by different requestors; means for retrieving the particular resource from the remote server once for the plurality of requests to obtain the particular resource requested by the plurality of requests; and means for thereafter sending the particular resource to the different requestors.

The advantages of the invention are numerous. Different embodiments or implementations may yield one or more of the following advantages. One advantage of the invention is that available bandwidth is more efficiently utilized. Another advantage of the invention is that maximum delay can be reduced by grouping requests for the same resource. Still another advantage of the invention is that "hot spots" at content servers due to a surge in demand can be handled in an orderly manner so as to significantly reduce risk of crashing the content server. Yet another advantage of the invention is that the inventive techniques are cost effective and, in particular, significantly more cost effective than using multiple mirror sites scaled to handle peak load conditions.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF EMBODIMENTS OF THE INVENTION

The invention relates to techniques for efficiently and economically providing data transfer through data networks. The invention is particularly suitable for Internet data transfers. In one aspect of the invention, delayed response processing is utilized. Incoming requests for common content are initially queued. After a short period of time, the queued requests are processed as a group so as to better utilize available bandwidth, particularly in times where traffic or congestion is high. In another aspect of the invention, multiple-destination data packets are utilized.

Embodiments of the invention are discussed below with reference to FIGS. 2-11. However, those skilled in the art will readily appreciate that the detailed description given herein with respect to these figures is for explanatory purposes as the invention extends beyond these limited embodiments.

Figure 1:
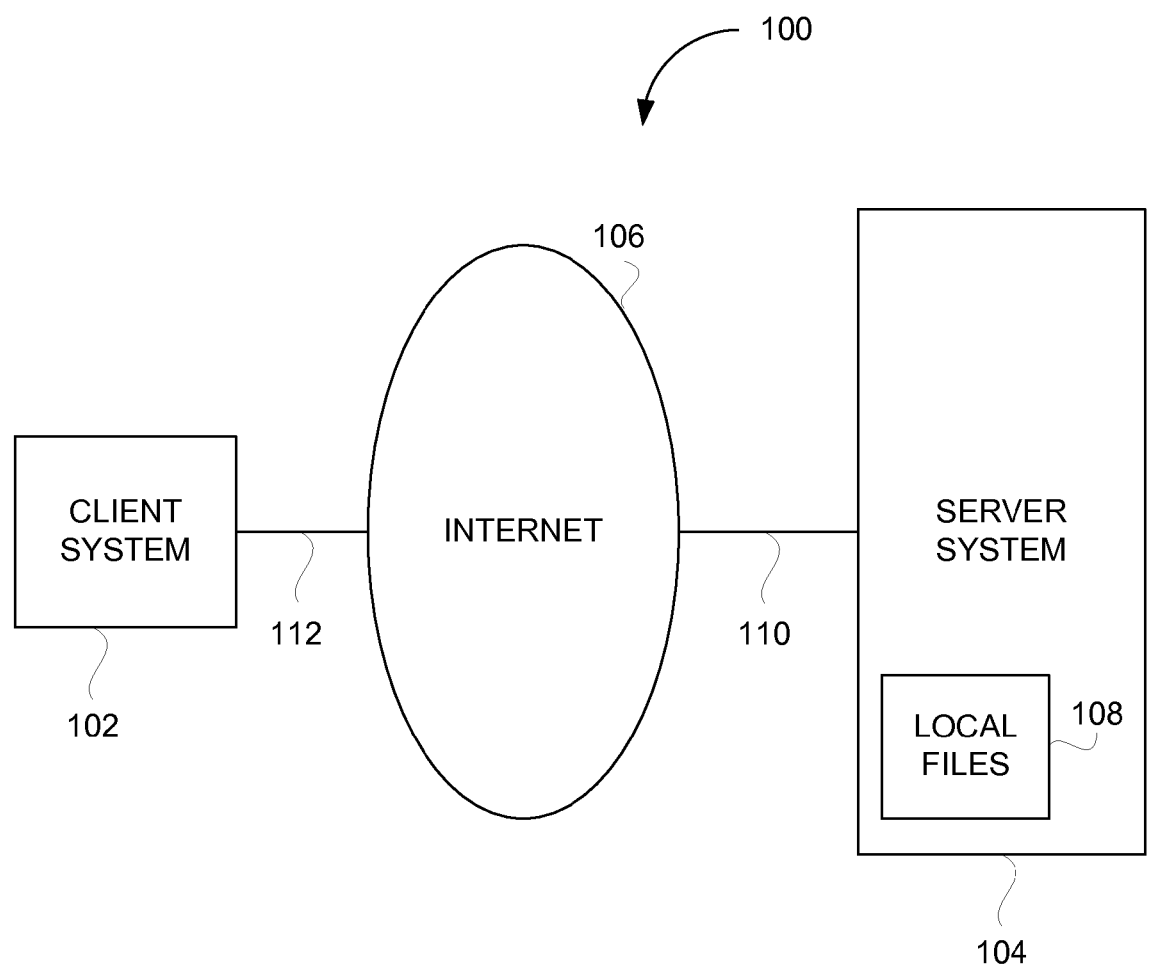
FIG. 1 is a conventional client/server system.
Figure 2:
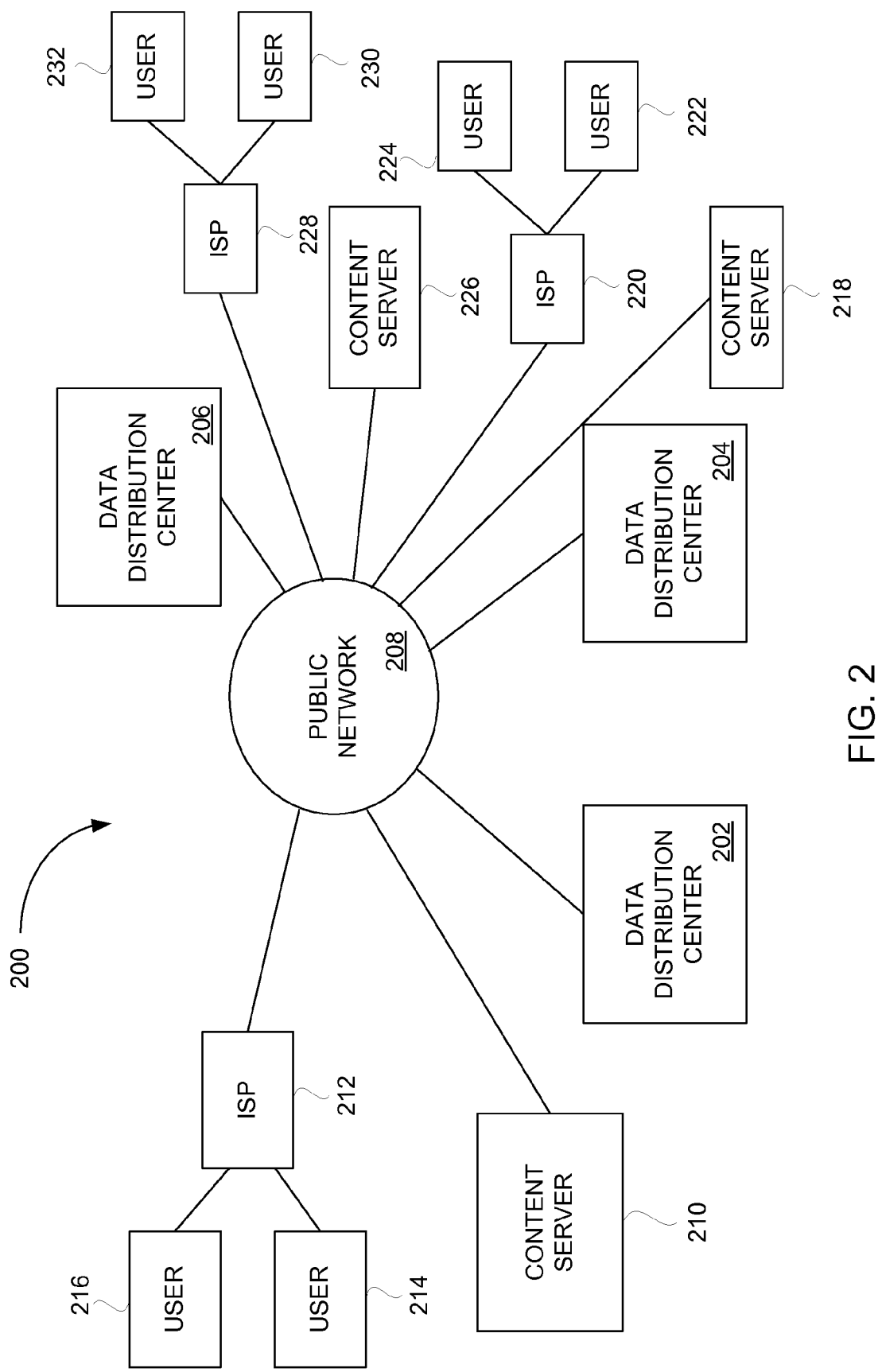
FIG. 2 is a data delivery system according to one embodiment of the invention.

FIG. 2 is a data delivery system 200 according to one embodiment of the invention. The data delivery system 200 includes a plurality of data distribution centers 202, 204 and 206. As shown in FIG. 2, the data distribution centers 202, 204 and 206 are coupled to a public network 208. In one embodiment, the public network 208 represents the Internet, a public telephone network, or data network infrastructure. Typically, the public network 208 is an arrangement of switching or routing centers and various other network infrastructure, and such arrangement is often hierarchical with local, regional and national levels. Hence, the data distribution centers 202, 204 and 206 can couple to a public network 208 at any level in the hierarchy.

A content server 210 and an Internet service provider (ISP) 212 are coupled to the public network 208. Of the data distribution centers 202, 204 and 206, the data distribution center 202 is most proximate (e.g., most local with respect to the public network 208) to the ISP 212. Users 214 and 216, which represent client machines, are able to couple to the ISP 212 to gain access to the public network 208 and resources provided via the public network 208. The content server 210 provides access to content (or resources) via the public network 208. The content server 210 can also be referred to as a web server or host website server. The content server 210 typically has access to content that can be delivered to requesting users over the public network 208. The content available at the content server 210 can, for example, be stored in a file storage system or a database within or coupled to the content server 210.

A content server 218 and an Internet service provider (ISP) 220 are coupled to the public network 208. Of the data distribution centers 202, 204 and 206, the data distribution center 204 is most proximate (e.g., most local with respect to the public network 208) to the ISP 220. Users 222 and 224, which represent client machines, are able to couple to the ISP 220 to gain access to the public network 208 and resources provided via the public network 208. The content server 218 provides access to content (or resources) via the public network 208. The content server 218 can also be referred to as a web server. The content server 218 typically has access to content that can be delivered to requesting users over the public network 208. The content available at the content server 218 can, for example, be stored in a file storage system or a database within or coupled to the content server 218.

A content server 226 and an Internet service provider (ISP) 228 are coupled to the public network 208. Of the data distribution centers 202, 204 and 206, the data distribution center 206 is most proximate (e.g., most local with respect to the public network 208) to the ISP 228. Users 230 and 232, which represent client machines, are able to couple to the ISP 228 to gain access to the public network 208 and resources provided via the public network 208. The content server 226 provides access to content (or resources) via the public network 208. The content server 226 can also be referred to as a web server. The content server 226 typically has access to content that can be delivered to requesting users over the public network 208. The content available at the content server 226 can, for example, be stored in a file storage system or a database within or coupled to the content server 226.

The data delivery system 200 operates as follows. Typically, users will couple to their ISP and request a resource residing on a content server coupled to the public network 208. For example, the user 214 can couple to the public network 208 through the ISP 212. The user 214 can then request a particular resource residing on a content server that also couples to the public network 208. For example, the user 214 could request a resource residing on the content server 226. At the same time, the user 216 could couple to the public network 208 through the ISP 212 and request the same particular resource from the content server 226. Conventionally, each of these requests for the particular resource would be separately serviced by the content server 226 and directed to the requesting user.

According to the invention, the multiple requests for the particular resource can be processed as a group such that the content server 226 in effect only satisfies a single request for the particular resource even though there are in fact two (or more) requesting parties in the group. In one implementation, the ISP 212 makes two requests for the particular resource from the content server 226 via the public network 208. The content server 226 groups together these requests for the same particular resource. Then, at the appropriate time, the content server 226 forwards the data of the particular resource through the public network 208 to the data distribution center 202. Here, in this example, the data distribution center 202 is chosen because it is most proximate to the destinations (e.g., requestors of the particular resource). At the data distribution center 202, the data for the particular resource that was requested will be directed to each of the requesting users 214 and 216. After the data distribution center 202 fulfills its duty in distributing the particular resource to the requesting users, the particular resource can be removed from the data distribution center 202. Hence, the data distribution centers preferably only store the resources from content servers for a limited amount of time (e.g., temporary storage), thereby allowing data distribution centers to be generally used by many content servers because their data storage burden is much less than that required by mirrored sites. In this example two requests for the particular resource were issued about the same time and were thus serviced as a group. Hence, even in this simplified example, the load on the content server 226 is able to be decreased and the congestion at the high speed link that couples the content server 226 to the public network 208 is able to be substantially reduced. However, the invention can yield tremendous reductions in traffic and congestion when thousands or millions of requests for like resources are being made about the same time.

It should be noted that the data delivery system 200 can also operate in a conventional manner if the data distribution centers 202, 204 and 206 are not utilized. Hence, the data delivery system 200 could utilized the improved data transmission techniques of the invention at times of high traffic or congestion (generally or for particular resources) and otherwise use conventional data delivery by bypassing the data distribution centers 202, 204 and 206.

The operation of the data delivery system 200 is described further below with respect to FIGS. 3-10.

Figure 3:
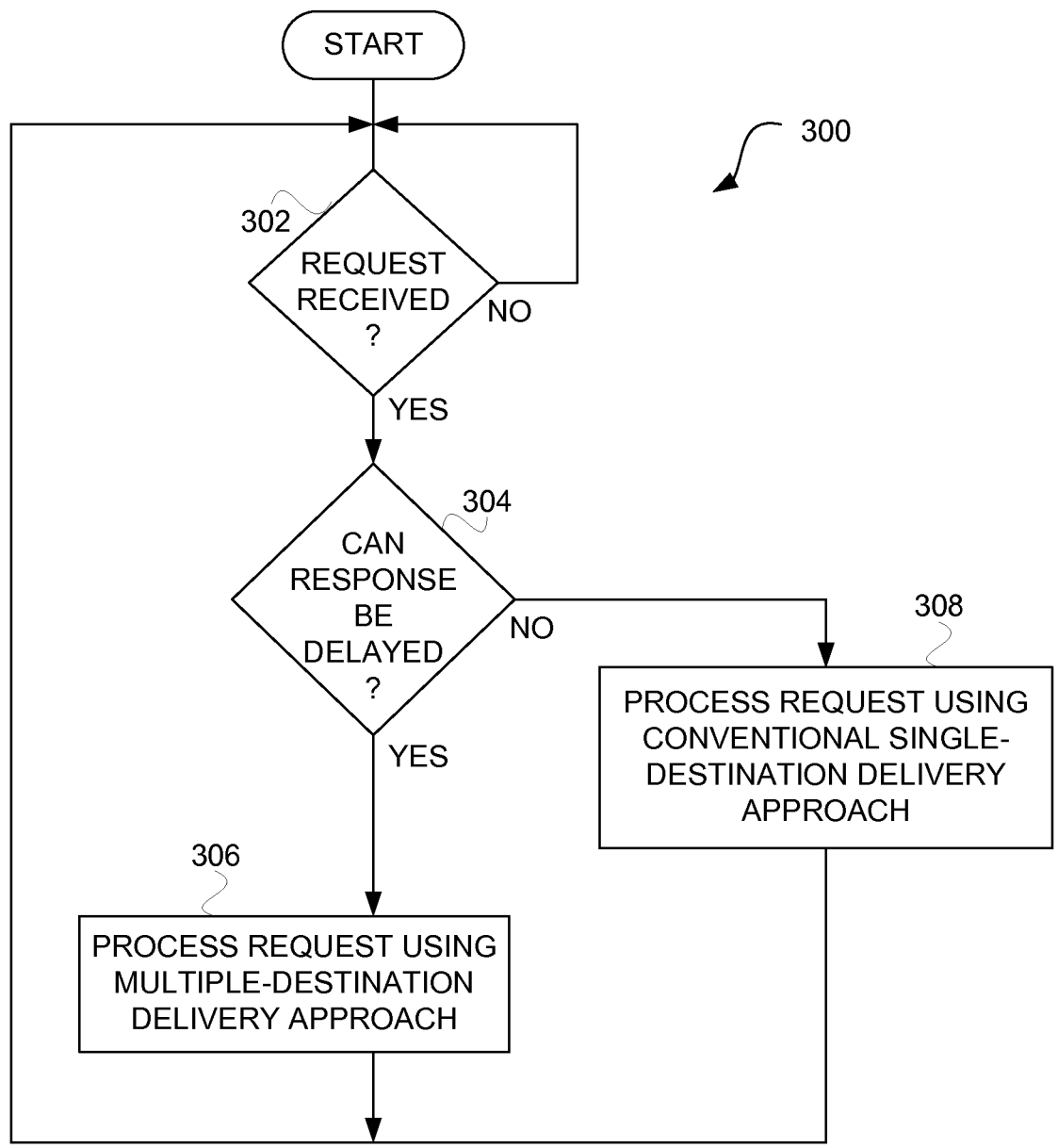
FIG. 3 illustrates a flow diagram of general request processing according to one embodiment of the invention.

FIG. 3 illustrates a flow diagram of general request processing 300 according to one embodiment of the invention. The general request processing 300 begins with a decision 302 that determines whether a request has been received. When the decision 302 determines that a request has not yet been received, the general request processing 300 awaits receipt of a request. Once the decision 302 determines that a request has been received, a decision 304 determines whether a response (to the request) can be delayed. In other words, the decision 304 determines whether the servicing of the request should be delayed for a small amount of time. In some situations, such as time sensitive transactions or confidential transactions/information, the response probably should not be delayed. However, when the servicing of the request can be delayed for a small amount of time, the response can be delivered in a manner that reduces traffic and congestion. It should be noted that the response can sometimes even be delivered faster even though initially delayed for a small amount of time. Since the general request processing 300 operates to reduce traffic and congestion, the response to a request need not be delayed when traffic and congestion are light. In any case, when the decision 304 determines that the response can be delayed, the request is processed 306 using a multiple-destination delivery approach. Alternatively, when the decision 304 determines that the response cannot be delayed, the request is processed 308 using a conventional single-destination delivery approach. Regardless of how the request is processed 306 or 308, thereafter, the general request processing 300 returns to repeat the decision 302 and subsequent blocks so that additional requests can be processed.

Figure 4:
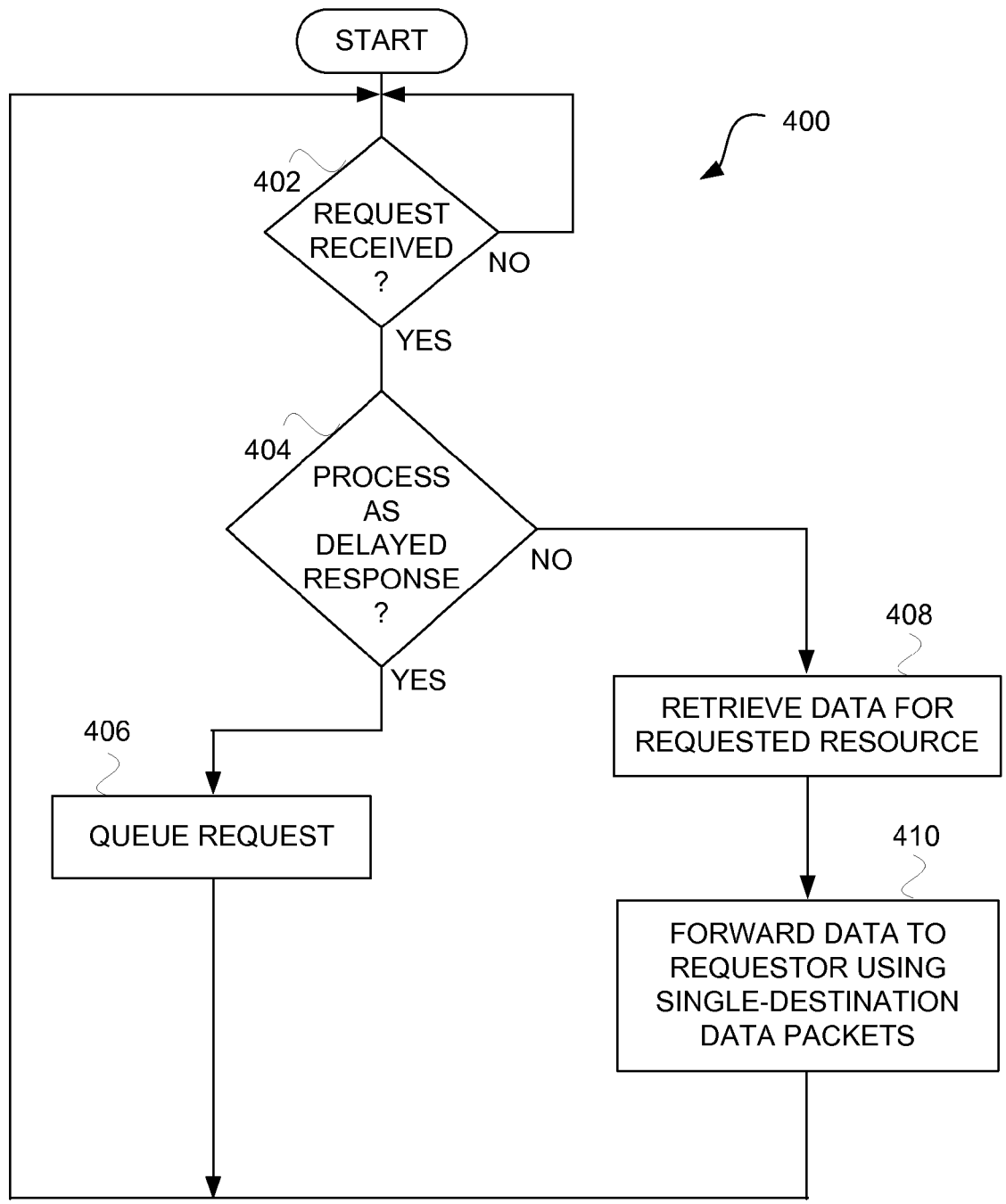
FIG. 4 is a flow diagram of data request processing according to one embodiment of the invention.

FIG. 4 is a flow diagram of data request processing 400 according to one embodiment of the invention. The data request processing 400 represents processing that is performed by servers, such as the content servers 210, 218 and 226 illustrated in FIG. 2.

The data request processing 400 initially begins with a decision 402 that determines whether a request has been received from a requestor. When the decision 402 determines that a request has not yet been received, the data request processing 400 awaits such a request. Once the decision 402 determines that a data request has been received, a decision 404 determines whether to process the data request as a delayed response. When the decision 404 determines that the request should be processed as a delayed response, then the request is queued 406. In one embodiment, the request is queued 406 at the content server that received the request. In another embodiment, the request can be queued 406 at the data distribution center most proximate to the destination for the requested content. Typically, the data distribution center that is most proximate to the content server is the data distribution center that couples the content server to the public network. In other embodiments, the request could be queued 406 in any suitable server (e.g., content server, data distribution center, etc.).

By placing the request in a queue, the request is therefore not immediately processed and, as a result, the response is referred to as a delayed response. However, it should be recognized that although the response is a delayed response, the receipt of the response by the requestor (requesting user) may indeed be sooner using the delayed response in cases in which there is heavy traffic or congestion.

On the other hand, when the decision 404 determines that the request should not be processed as a delayed response, the requested data is retrieved 408 from the content server (web server). For example, the content server may internally store the requested data or have access to a database for other data storage device holding the requested content. Once the requested data has been retrieved, the data is forwarded 410 to the requester using single-destination data packets. Following the operations 406 or 410, the data request processing 400 returns to repeat the decision 402 and subsequent blocks so that additional requests can be processed.

Figure 5:
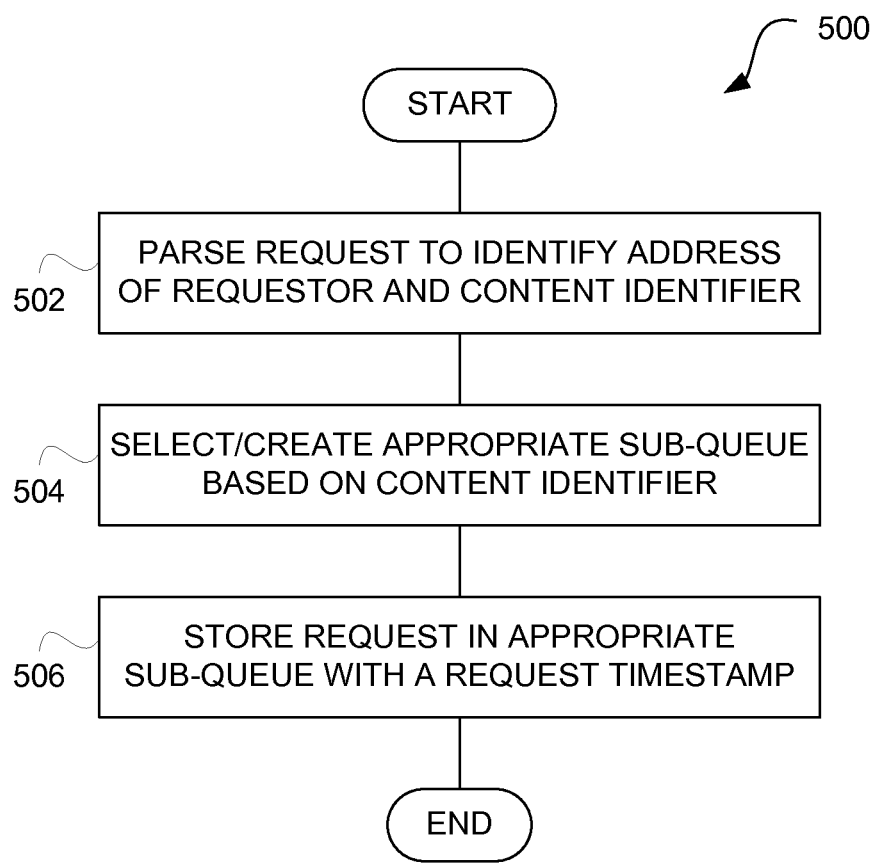
FIG. 5 is a flow diagram of queue request processing according to one embodiment of the invention.

FIG. 5 is a flow diagram of queue request processing 500 according to one embodiment of the invention. The queue request processing 500 represents processing performed by a suitable server when the request is placed in its queue and processed in a delayed manner, such as the operation 406 illustrated in FIG. 4.

The queue request processing 500 initially parses 502 the request to identify an address of requester and a content identifier. In one implementation, the address of the requestor is an Internet Protocol (IP) address and the content identifier is a Universal Resource Locator (URL). Next, an appropriate sub-queue can be selected or created 504 based on the content identifier. A sub-queue can be a portion of a queue or a separate queue of a plurality of queues. Thereafter, the request is stored 506 in the appropriate sub-queue with a request time stamp. The request time stamp indicates the time (and perhaps date) that the request was made by the requestor (or time received by a suitable server). Following operation 506, the queue request processing 500 is complete and ends.

Figure 6:
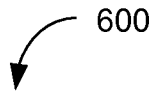
FIG. 6 is an exemplary diagram of a sub-queue suitable for use with the invention.

FIG. 6 is an exemplary diagram of a sub-queue 600 suitable for use with the invention. The sub-queue 600 is a particular sub-queue for the content identifier referred to as a "file_1".

In the sub-queue 600 illustrated in FIG. 6, the sub-queue 600 includes a large number of requests for the "file_1" content. Each entry in the sub-queue 600 stores the request, the destination for the response (also the origin of the request), and the request time stamp. The destination as shown in the sub-queue 600 identifies a particular geographic and/or telecommunication region for the destination of the requested content. As shown in FIG. 6, the destinations are, for example, region D or region G. The destination can be formatted or resolved in a variety of ways, including using initial portions of the IP addresses that are associated with the requestors.

Figure 7:
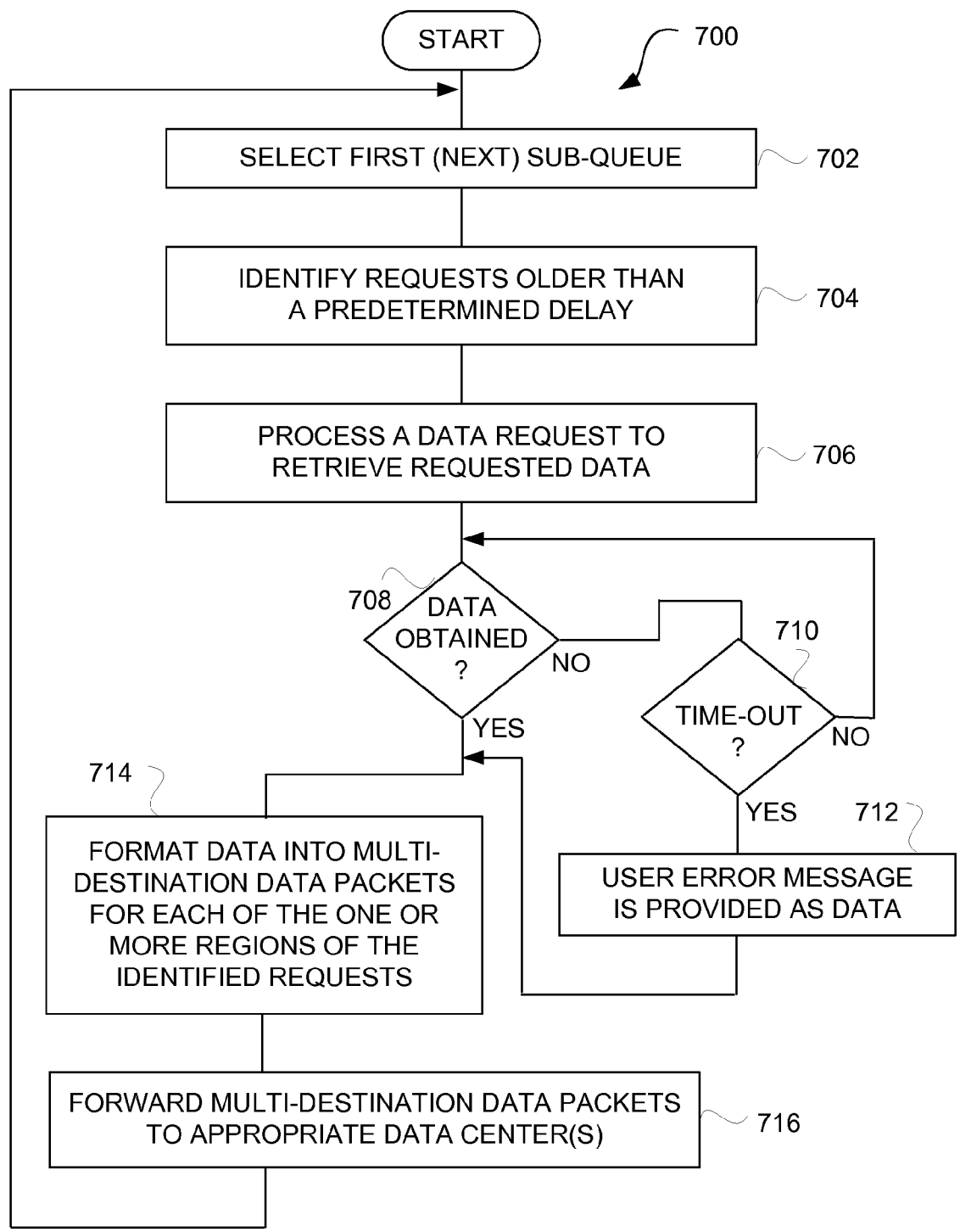
FIG. 7 is a flow diagram of data distribution center periodic request fulfillment processing according to one embodiment of the invention.

FIG. 7 is a flow diagram of periodic request fulfillment processing 700 according to one embodiment of the invention. The periodic request fulfillment processing 700 operates to service the requests that have been queued for delayed responses. The periodic request fulfillment processing 700 represents processing that is performed by a suitable server, typically the server in which the requests are queued.

The periodic request fulfillment processing 700 initially selects 702 a first sub-queue to be processed. Then, within the selected sub-queue, at least those requests that are older than a predetermined delay are identified 704. Then, a data request is processed 706 to retrieve the requested data. Typically, the requested data is local to the server that hosts the queue; however, if not, the data request would be forwarded to the appropriate content server. The data request obtains the data that the various requests in the identified sub-queue are all seeking. Next, a decision 708 determines whether the response data has been obtained. When the decision 708 determines that the response data has not yet been received, a decision 710 determines whether a time-out has occurred. When the decision 710 determines that a time-out has not yet occurred, the periodic request fulfillment processing 700 returns to repeat the decision 708. Alternatively, when the decision 710 determines that a time-out has occurred, a user error message is provided 712 as the received data because the content server is not delivering the requested data. On the other hand, when the decision 708 determines that the requested data has been received, as well as following the operation 712, the data is formatted 714 into multi-destination data packets for each of the one or more regions of the identified requests. The multi-destination data packets are then forwarded 716 to the appropriate one or more data distribution centers. Following operation 716, the data distribution center periodic request fulfillment processing 700 returns to repeat the operation 702 and subsequent blocks so that other sub-queues can be similarly processed. For example, when the operation 712 is revisited, a next sub-queue would be selected 702 and then processed in a like manner.

As an example of the operation of the periodic request fulfillment processing 700, consider the following situation with reference to FIGS. 2 and 6. Assume that the sub-queue 600 is maintained by the content server 226. The sub-queue 600 would be periodically examined to identify at those of the requests that are older than the predetermined delay. For this example, assume that all the requests in the sub-queue 600 shown in FIG. 6 are older than the predetermined delay. Assume also that the data requested, namely file_1, resides on the content server 226. In this example, the periodic request fulfillment processing 700 operates to cause the content server 226 to locally retrieve the response data. Once the response data has been retrieved, the content server 226 formats the response data into multi-destination data packets and then forwards the multi-destination data packets to the data distribution center supporting region D as well as to the data distribution center supporting region G. For example, the response data forwarded to the data distribution center supporting the region D would receive multi-destination data packets identifying the requestors for the requests #1000, #1002, #1020, #1021 and #1022. Here, the multi-destination data packets could identify five requestors (users) that are to all receive the same content. Likewise, the data distribution center supporting the region G would receive multi-destination data packets identifying the requestors for the requests #1001, #1003 and #2000. Here, the multi-destination data packets could identify three requestors (users) that are to all receive the same content.

Figure 8A:
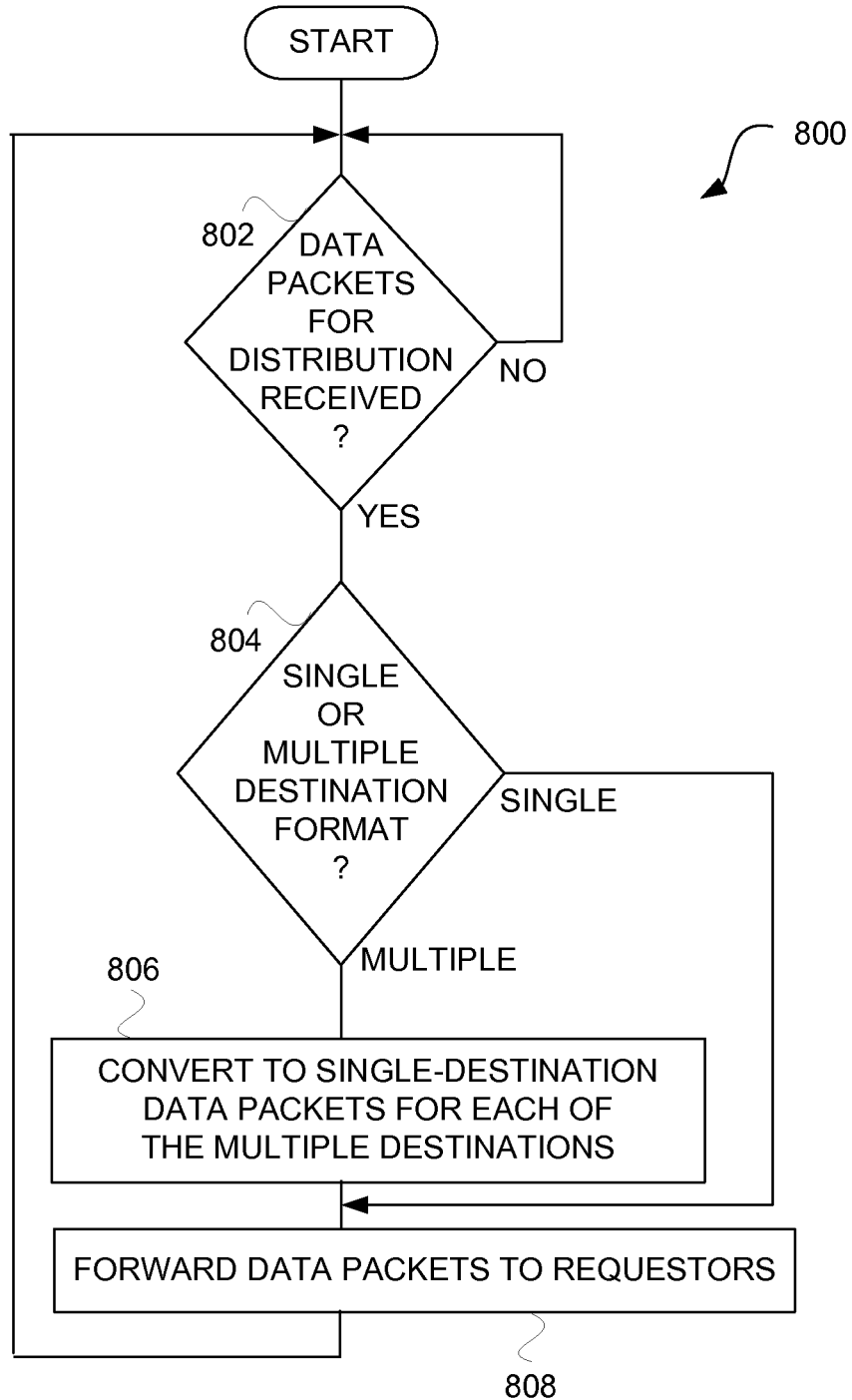
FIG. 8A is a flow diagram of data distribution center response processing according to one embodiment of the invention.

FIG. 8A is a flow diagram of data distribution center response processing 800 according to one embodiment of the invention. The data distribution center response processing 800 is the processing performed by a data distribution center in directing the requested data back to the requestors. The data distribution center response processing 800 is, for example, processing that is performed by data distribution centers, such as the data distribution centers 202, 204 and 206 illustrated in FIG. 2.

The data distribution center response processing 800 begins with a decision 802 that determines whether data packets for distribution have been received at the data distribution center. When the decision 802 determines that data packets for distribution have not yet been received, the data distribution center response processing 800 awaits the receipt of data packets.

On the other hand, when the decision 802 determines that data packets for distribution have been received, then a decision 804 determines whether single or multiple destination formatted packets are being utilized. Here, the packets are being sent to a particular data distribution center (from presumably a content server or other suitable server) for distribution to various requestors. Here, the incoming data packets destined for requestors are examined so as to determine whether they are multi-destination format or single-destination format. When the decision 804 determines that the packets are multi-destination format, then the multi-destination data packets are converted 806 into single-destination data packets for each of the multiple destinations. The operation 806 is bypassed when the decision 804 determines that the packets are already in a single-destination format. Thereafter, the single-destination data packets are forwarded 808 to the appropriate requestors. After the data packets associated with the responses have been forwarded 808 to the appropriate requestors, the data distribution center response processing 800 is complete and ends.

Alternatively, when the decision 802 determines that the incoming data packets are single-destination format, then the operation 804 is bypassed and the data packets are forwarded 806 without conversion. Accordingly, the data distribution centers can be designed to handle both single-destination data packets as well as multiple-destination data packets, thereby allowing the data distribution centers to be compatible with existing single-destination data packet routing and delivery to requestors. However, it should be noted that the data distribution centers could also be designed to handle only multiple-destination data packets and have conventional single destination data packets not be exchanged between data distribution centers.

The packet conversion performed will vary with different standards and protocols being used. Local area networks and wideband longhaul networks and/or different telecommunication networks in Europe, Japan, US, Mexico, etc. all have different standards and protocols for their own data packets for data transmission. Standards such as X.25, V.32, . . . Ethernet, Darpanet, and other public or private networks often have different standards and protocols for defining their own data packets. Normally, through another layer of gateways which convert the data packets of different protocols to a standard used in the Internet, such as TCP/IP protocols. Nevertheless, data packets normally include at least a control field, a data field, a source field, a destination field, and an ID field.

Figure 8B:
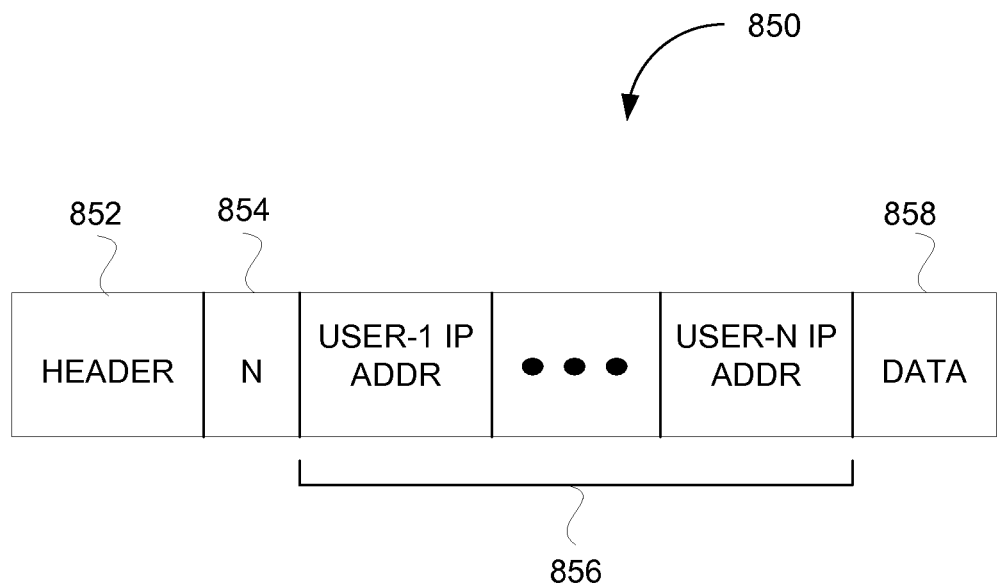
FIG. 8B illustrates a representative multi-destination data packet according to one embodiment of the invention.

In one embodiment, the packet conversion from multi-destination data packets to single-destination data packets (e.g., conversion 806) can be performed as follows. A conventional single-destination data packet includes a header field, a destination address field, and a data field. The header field can, among other things, include the address of the requestor. Further, the header field can also include the address of the requestor's ISP and perhaps the requestor's user ID for the ISP. Such single-destination data packets can be converted into multi-destination data packets. FIG. 8B illustrates a representative multi-destination data packet 850 according to one embodiment of the invention. The multi-destination data packet 850 includes a header field 852, a number of users (N) field 854, a multi-user address field 856, and a data field 858. The multi-user address field 856 includes an address (e.g., IP address) for each of the N users. Each of the address fields for the N users include the requestor's address and may also include the address of the requestor's ISP and perhaps the requestor's user ID for the ISP.

The delay amount (predetermined time or wait time) can be determined or influenced by one or more of the client, server, network administrator, or network. In one embodiment, the delay amount can be set to have an upper limit. An example of such an upper limit is ten (10) seconds. The delay amount can vary as well. The delay time can vary depending on the type of data be requested or transferred. For example, greater delay might be appropriate for graphic than text. As another example, delay time can be shorter for high priority information and can be longer for lower priority information. For example, emergency information or other near real-time data (e.g., stock quotes) might use a shorter delay time such as 1 second, whereas less timely data might use a longer delay time such as 10 seconds. The delay time can also vary depending on the amount of data being requested or transferred. For example, for small amounts of data (resources) the delay time can be shorter (e.g., 2-5 seconds), and for large amounts of data (resources) the delay time can be longer (e.g., 10-20 seconds).

Figure 9:
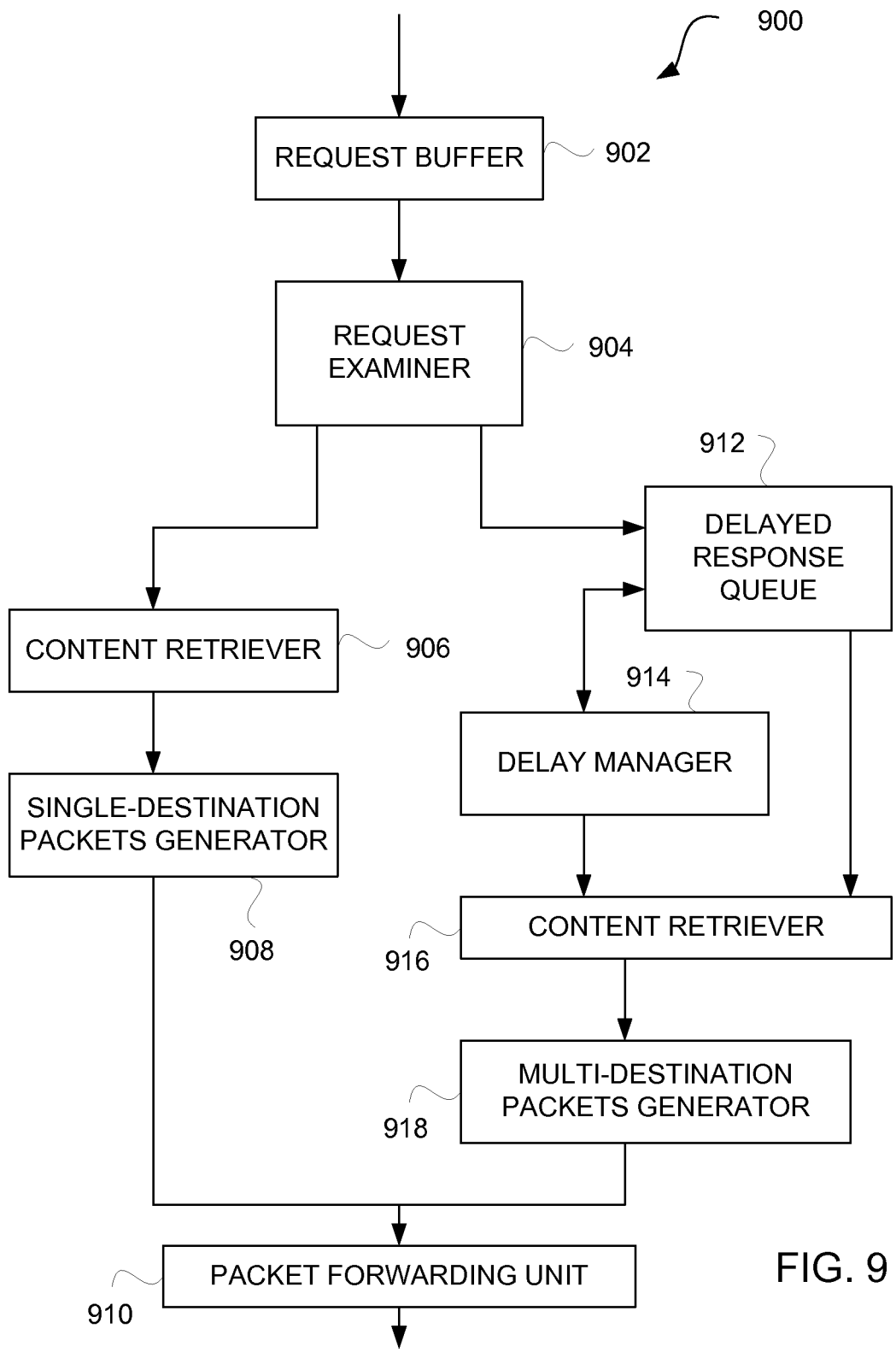
FIG. 9 is a functional block diagram of a server according to one embodiment of the invention.

FIG. 9 is a functional block diagram of a server 900 according to one embodiment of the invention. The server 900 is, for example, can be representative of the content servers 210, 218 and 226 illustrated in FIG. 2. The server includes a request buffer 902 that receives the incoming requests for content to the server 900. A request examiner 904 examines the incoming requests to determine whether delay response processing should be performed.

When the request examiner 904 determines that an incoming request should not be delayed, then the request is sent to a content retriever 906 which operates to receive the data requesting by the request. A single-destination packets generator 908 then generates single-destination packets including the requested data. A packet forwarding unit 910 then forwards the single-destination packets to the single destination associated with the request.

The request examiner 904 can determine whether the incoming request should not be delayed in various ways. For example, the incoming request could indicate whether it should be delayed or not. As another example, the server 900 could also trigger delayed processing or not based on load or congestion detection.

Alternatively, when the request examiner 904 determines that an incoming request should be delayed, then the request is sent to a delayed response queue 912. The request remains in the delayed response queue 912 until a delay manager 914 determines that the request should be processed. Typically, the amount of delay imposed is a time delay which has an upper bound so as to prevent excessive delay. The amount of delay can also be influenced by the quantity of the requests in the delayed response queue 912. In any case, when the delay manager 914 determines that a plurality of requests for the same content (data) in the delayed response queue 912 should be processed, then a content retriever retrieves the data requested by the requests. A multi-destination packets generator 918 then generates multi-destination packets including the requested data for the plurality of requests. The packet forwarding unit 910 then forwards the multi-destination packets to the multiple destinations associated with the requests via one or more data distribution centers.

Figure 10:
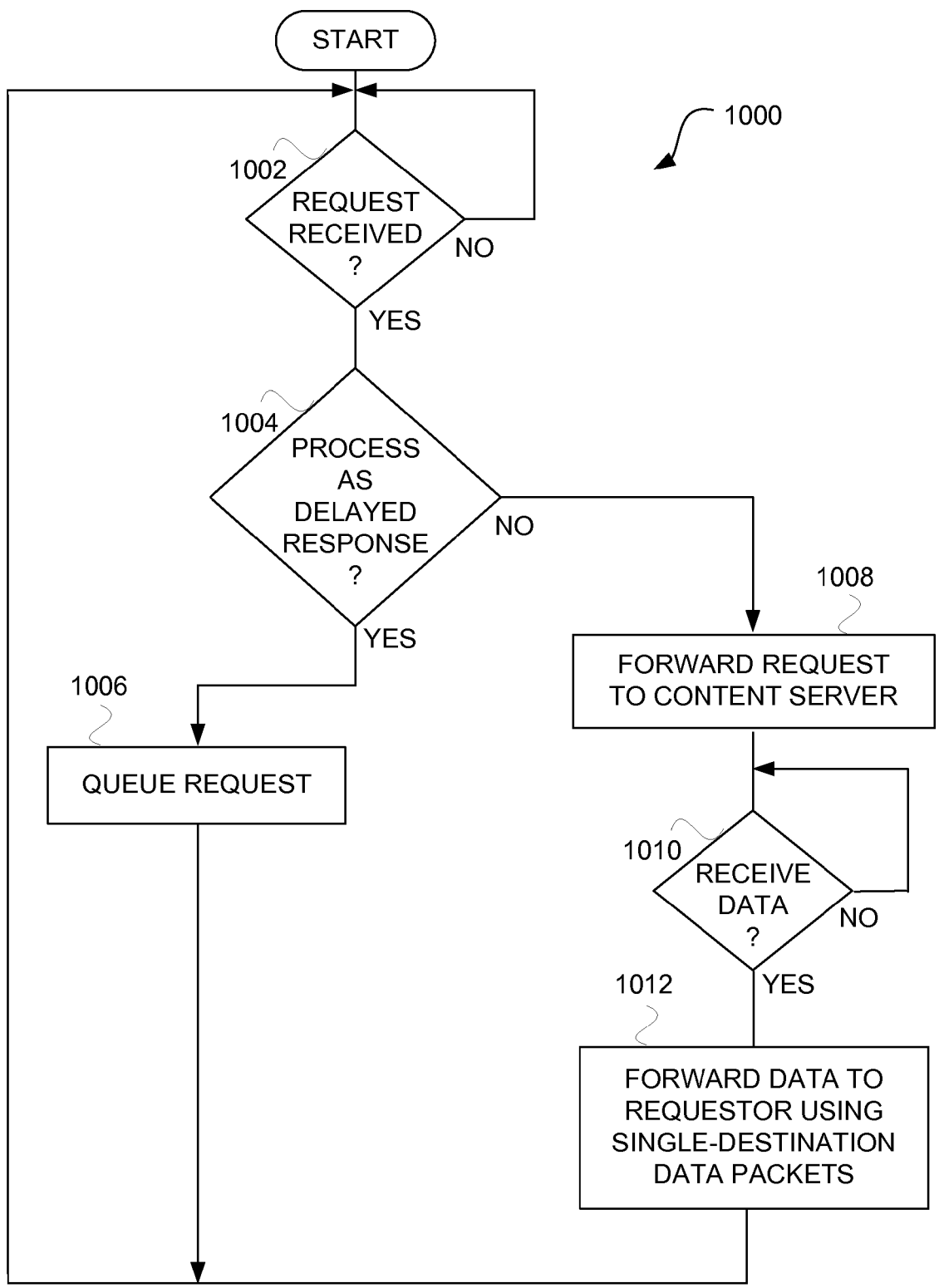
FIG. 10 is a flow diagram of data distribution center request processing according to one embodiment of the invention.

As noted above the requests being subjected to delayed processing are temporarily held in a queue at a suitable server. FIG. 4 discussed processing where a server such as a content server includes the queue for the requests being delayed. FIG. 10 describes processing where a server such as a data distribution server includes the queue for the requests being delayed.

FIG. 10 is a flow diagram of data distribution center request processing 1000 according to one embodiment of the invention. The data distribution center request processing 1000 represents processing that is performed by data distribution centers, such as the data distribution centers 202, 204 and 206 illustrated in FIG. 2.

The data distribution center request processing 1000 initially begins with a decision 1002 that determines whether a request has been received from a requestor. When the decision 1002 determines that a request has not yet been received, the data distribution center request processing 1000 awaits such a request. Once the decision 1002 determines that a data request has been received, a decision 1004 determines whether to process the data request as a delayed response. When the decision 1004 determines that the request should be processed as a delayed response, then the request is queued 1006. In one embodiment, the requested is queued 1006 at the data distribution center most proximate to the destinations. In other embodiments, the request could be queued 1006 in any data distribution center. By placing the request in a queue at a data distribution center, the request is therefore not immediately processed and, as a result, the response is referred to as a delayed response. However, it should be recognized that although the response is a delayed response, the receipt of the response at the requesting site may indeed be sooner using the delayed response in cases in which there is high traffic levels or congestion.

On the other hand, when the decision 1004 determines that the request should not be processed as a delayed response, the request is forwarded 1008 to the appropriate content server (web server). Typically, the request traverses the public network when being forwarded to the appropriate content server. Once the request is received at the appropriate content server, the content server attempts to service the request and return the requested data. A decision 1010 then determines whether the requested data has been received. Once the requested data has been received, the data is forwarded 1012 to the requester using single-destination data packets. Following the operations 1006 or 1012, the data distribution center request processing 1000 returns to repeat the decision 1002 and subsequent blocks so that additional requests can be processed. It should be understood that, although the data distribution center request processing 1000 is able to handle the forwarding of the request to the content server as well as the forwarding of the response data to the requestor, the data distribution center could alternatively not be involved in processing any requests that are not to be satisfied with a delayed response.

Figure 11:
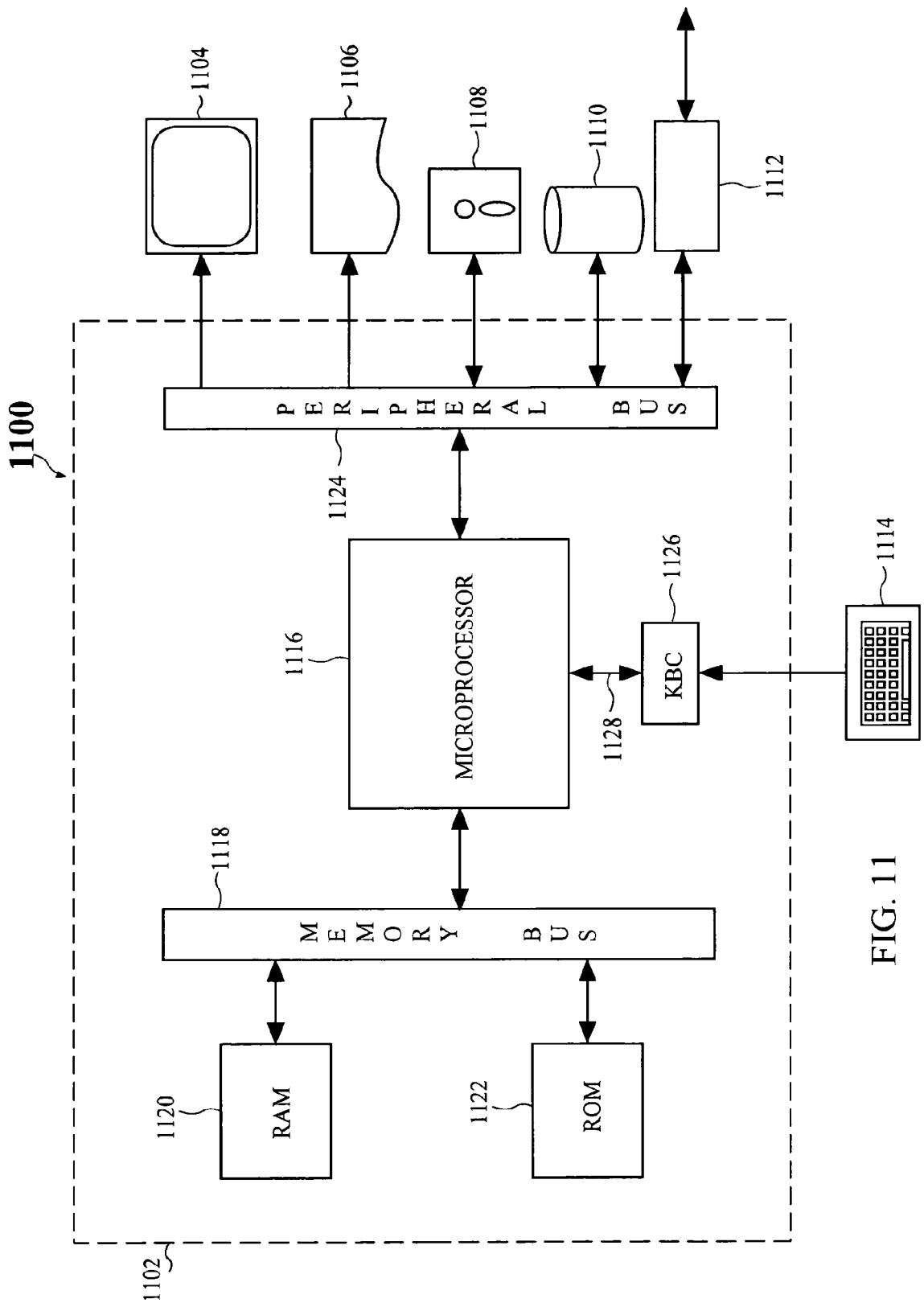
FIG. 11 is a block diagram of an exemplary computer system for use with the invention.

FIG. 11 is a block diagram of an exemplary computer system 1100 for use with the invention. For example, the computer system 1100 can, for example, be representative of the computers utilized by the users, the content servers, and the data distribution centers.

The computer system 1100 includes a digital computer 1102, a display screen (or monitor) 1104, a printer 1106, a removable media drive 1108 (e.g., floppy disk, tape, CD, DVD), a hard disk drive 1110, media bay(s) 1112, and a keyboard 1114. The digital computer 1102 includes a microprocessor 1116, a memory bus 1118, random access memory (RAM) 1120, read only memory (ROM) 1122, a peripheral bus 1124, and a keyboard controller 1126. The digital computer 1102 can be a personal computer, a workstation computer, or some other type of computer.

The microprocessor 1116 is a general purpose digital processor which controls the operation of the computer system 1100. The microprocessor 1116 can be a single-chip processor or can be implemented with multiple components. Using instructions retrieved from memory, the microprocessor 1116 controls the reception and manipulation of input data and the output and display of data on output devices.

The memory bus 1118 is used by the microprocessor 1116 to access the RAM 1120 and the ROM 1122. The RAM 1120 is used by the microprocessor 1116 as a general storage area and as scratch-pad memory, and can also be used to store input data and processed data. The ROM 1122 can be used to store instructions or program code followed by the microprocessor 1116 as well as other data.

The peripheral bus 1124 is used to access the input, output, and storage devices used by the digital computer 1102. In the described embodiment, these devices include the display screen 1104, the printer device 1106, the removable media disk drive 1108, the hard disk drive 1110, and the media bay(s) 1112. The keyboard controller 1126 is used to receive input from the keyboard 1114 and send decoded symbols for each pressed key to the microprocessor 1116 over bus 1128.

The display screen 1104 is an output device that displays images of data provided by the microprocessor 1116 via the peripheral bus 1124 or provided by other components in the computer system 1100. The printer device 1106 when operating as a printer provides an image on a sheet of paper or a similar surface. Other output devices such as a plotter, typesetter, etc. can be used in place of, or in addition to, the printer device 1106.

The removable media drive 1108 and the hard disk drive 1110 can be used to store various types of data. The removable media drive 1108 facilitates transporting such data to other computer systems, and hard disk drive 1110 permits fast access to large amounts of stored data.

The microprocessor 1116 together with an operating system operate to execute computer code and produce and use data. The computer code and data may reside on the RAM 1120, the ROM 1122, or the hard disk drive 1120. The computer code and data could also reside on a removable program medium and loaded or installed onto the computer system 1100 when needed. Removable program mediums include, for example, CD-ROM, DVD, PC-CARD, floppy disk and magnetic tape. In the case where the computer system 1100 is used by the users of FIG. 2, then the computer code typically includes a network browser application.

The one or more media bays 1112 are used to receive media bay devices to provide greater resources to the computer system. As examples, the types of devices include a floppy drive, a hard drive, a CD-ROM drive, a DVD drive, or a tape drive. The media bays are accessible from external to the computer system so that media bay devices can be easily inserted into the media bays or removed from the media bays. The removability of the media bay devices allows a few media bays to support a variety of different types of devices in a flexible manner.

The keyboard 1114 is used by a user to input commands and other instructions to the computer system 1100. Other types of user input devices can also be used in conjunction with the present invention. For example, pointing devices such as a computer mouse, a track ball, a stylus, or a tablet can be used to manipulate a pointer on a screen of a general-purpose computer.

Another aspect of the invention pertains to a graphical user interface (GUI) that enables clients or users to request or decline delayed response processing. For example, a user requesting confidential information, financial transactions, personalized or customized situations from a remote server can use the GUI to ensure that their request is processed individually (i.e., not grouped with other like requests). The GUI can, for example, pertain to a button (e.g., control button) that is display by a network browser utilized on the client's machine.

Still another aspect of the invention is that a packet switch router can includes mechanisms for incorporating multiple destination addresses (multiple-destination format) with a single data packet.

Further, the multiple-destination format packets may have some inefficiencies due to a small amount of data in the packets due to so many destination bits. If the data packet is too large, then, the routing efficiency, or waiting times for other smaller data packets might be too long. Hence, still another aspect of the invention is to use a separate control frame to include all the destination addresses, and only include the local switching office's (e.g., data distribution center) destination address plus a special code to identify these special data packets. All the subsequent data packets will have a short switching office's destination address plus a special code to identify the data packets are multiple destination addresses type. All the destination addresses in the control frame will be stored in the special buffer memory for subsequent local loop connections for only a certain period of time defined in the control frame. Typically, the certain period of time would be no more than 60 seconds for passing up all the data packets, after 60 seconds, the destination addresses bits should be discarded, and leave room for the next ones in the queue. If the 60 seconds is not long enough for a large number of data packets, say a large image files transmitted in thousands of smaller data packets, then, the multiple destination control frame shall be re-submitted in sequence every few hundred data packets by the remote host web site servers.

Still further another aspect of the invention is that servers can encourage clients to use the delayed response processing by credits and/or incentives.

The invention can be implemented in software, hardware, or a combination of hardware and software. The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices, carrier waves. The computer readable medium can also be distributed over a network coupled computer systems so that the computer readable code is stored and executed in a distributed fashion.

The advantages of the invention are numerous. Different embodiments or implementations may yield one or more of the following advantages. One advantage of the invention is that available bandwidth is more efficiently utilized. Another advantage of the invention is that maximum delay is reduced by grouping requests for the same resource. Still another advantage of the invention is that "hot spots" at content servers due to a surge in demand can be handled in an orderly manner so as to significantly reduce risk of crashing the content server. Yet another advantage of the invention is that the inventive techniques are cost effective and, in particular, significantly more cost effective than using multiple mirror sites scaled to handle peak load condition.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for sending data over the Internet, said method comprising:

receiving a plurality of requests for a particular resource provided at a remote server on the Internet, the plurality of requests being provided by different requestors;

retrieving the particular resource from the remote server once for the plurality of requests to obtain the particular resource requested by the plurality of requests; and thereafter sending the particular resource to the different requestors, wherein the particular resource comprises digital data, wherein said sending of the particular resource to the different requestors comprises forming multi-destination data packets to carry data of the particular resource, and transmitting the multi-destination data packets, and wherein the plurality of requests for the particular resource are all received within a predetermined period of time.

2. A method for sending data over the Internet, said method comprising:

receiving a plurality of requests for a particular resource provided at a remote server on the Internet, the plurality of requests being provided by different requestors;

retrieving the particular resource from the remote server once for the plurality of requests to obtain the particular resource requested by the plurality of requests; and thereafter sending the particular resource to the different requestors, wherein the particular resource comprises digital data, wherein said sending of the particular resource to the different requestors comprises forming multi-destination data packets to carry data of the particular resource, and transmitting the multi-destination data packets, and wherein said retrieving and/or said sending is performed after the oldest one of the plurality of requests has been delayed for the predetermined period of time.

3. A method for sending data over the Internet, said method comprising:

receiving a plurality of requests for a particular resource provided at a remote server on the Internet, the plurality of requests being provided by different requestors;

retrieving the particular resource from the remote server once for the plurality of requests to obtain the particular resource requested by the plurality of requests; and thereafter sending the particular resource to the different requestors, wherein the particular resource comprises digital data, wherein said sending of the particular resource to the different requestors comprises forming multi-destination data packets to carry data of the particular resource, and transmitting the multi-destination data packets, and wherein said retrieving and/or said sending is performed after the oldest one of the plurality of requests has been delayed for the predetermined period of time or after a predetermined quantity of the plurality of requests have been received.

4. A method as recited in claim 1, wherein said sending of the particular resource to the different requestors comprises:

forming multi-destination data packets to carry data of the particular resource; and transmitting the multi-destination data packets.

5. A method for sending data over the Internet, said method comprising:

receiving a plurality of requests for a particular resource provided at a remote server on the Internet, the plurality of requests being provided by different requestors;

retrieving the particular resource from the remote server once for the plurality of requests to obtain the particular resource requested by the plurality of requests; and thereafter sending the particular resource to the different requestors, wherein the particular resource comprises digital data, wherein said sending of the particular resource to the different requestors comprises forming multi-destination data packets to carry data of the particular resource, and transmitting the multi-destination data packets, and wherein said sending of the particular resource to the different requestors comprises:

forming multi-destination data packets to carry data of the particular resource; and transmitting the multi-destination data packets.

\* \* \* \* \*